(12) United States Patent  
Lvovskiy (10) Patent No.: US 9,291,821 B1  
(45) Date of Patent: Mar. 22, 2016

(54) WIDE-ANGLE HEAD-UP DISPLAY WITH THREE-COMPONENT COMBINER

(71) Applicant: Matvey Lvovskiy, Brooklyn, NY (US)

(72) Inventor: Matvey Lvovskiy, Brooklyn, NY (US)

(73) Assignee: Matvey Lvovskiy

(*) Notice: Subject to any disclaimer, the term of this patent is extended or adjusted under 35 U.S.C. 154(b) by 0 days.

(21) Appl. No.: 14/639,289

(22) Filed: Mar. 5, 2015

(51) Int. Cl.
| | |
|---|---|
| G02B 27/14 | (2006.01) |
| G09G 5/00 | (2006.01) |
| G02B 27/01 | (2006.01) |
| G02B 27/00 | (2006.01) |
| G02B 27/30 | (2006.01) |

(52) U.S. Cl.
CPC ............ *G02B 27/0101* (2013.01); *G02B 27/01* (2013.01); *G02B 27/017* (2013.01); *G02B 27/0172* (2013.01); *G09G 5/00* (2013.01); *G02B 27/0093* (2013.01); *G02B 27/30* (2013.01); *G02B 2027/0118* (2013.01); *G02B 2027/0123* (2013.01); *G02B 2027/0125* (2013.01); *G02B 2027/0147* (2013.01)

(58) Field of Classification Search
CPC ............... G02B 27/01; G02B 27/0101; G02B 27/0103; G02B 27/0149; G02B 27/017; G02B 27/0172; G02B 27/30; G02B 2027/0118; G02B 2027/0125; G02B 2027/015; G02B 2027/0147; G02B 27/0093; G02B 5/04; G02B 5/30; G02B 5/00; G09B 5/00

USPC .................. 359/630, 631, 633, 634, 637, 641; 345/7–9, 633; 348/40, 148, 158; 349/11

See application file for complete search history.

(56) References Cited

U.S. PATENT DOCUMENTS

| | | |
|---|---|---|
| 3,940,204 A | 2/1976 | Withrington |
| 4,218,111 A | 8/1980 | Withrington et al. |
| 5,640,275 A | 6/1997 | Bourguignat et al. |
| 5,684,634 A | 11/1997 | Rogers |
| 6,392,812 B1 | 5/2002 | Howard |
| 6,750,832 B1 * | 6/2004 | Kleinschmidt ........ B60K 35/00 345/7 |
| 7,391,574 B2 | 6/2008 | Fredriksson |
| 8,305,295 B2 | 11/2012 | Lvovskiy et al. |
| 8,982,472 B2 * | 3/2015 | Lvovskiy ............... G02B 27/30 345/7 |

* cited by examiner

*Primary Examiner* — Loha Ben  
(74) *Attorney, Agent, or Firm* — Yefim Kreydin (57) ABSTRACT

HUD wherein increasing of full and instantaneous angular fields of view horizontal and vertical is achieved by using two or several unified sources of collimated image USCI arranged in horizontal plane, containing main and secondary optoelectronic channels each consisting of a display module forming a part of full primary image and axisymmetric collimating lens system with square shaped angular field of view provided with single optical combiner for viewing combined collimated image of primary information picture against outer space background consisting of three semitransparent reflectors, first and second installed mutually parallel above output lenses of USCI main channels, third reflector installed above output lenses of secondary channels with optical axes located between first and second reflectors and shifted related to first reflector at an angle under which operating beams of secondary channels pass through eyes box of operator.

14 Claims, 4 Drawing Sheets

WIDE-ANGLE HEAD-UP DISPLAY WITH THREE-COMPONENT COMBINER

BACKGROUND OF THE INVENTION

A wide-angle Head-Up display with three-component combiner providing imaging of graphic information of various type in optical infinity intended for piloting and performance of various tasks in aircrafts, helicopters, cars and other operated objects is proposed. Head-Up display, further indicated HUD, consists of two basic parts: a display module generating an original informational image of high brightness and an optical system projecting the original image to optical infinity against an outer space background in the direction of view of an operator. Such optical system is known as collimating optical system and the image formed by this system is known as collimated image. Being a part of the collimating optical system a semitransparent combiner is used to combine the luminous collimated image with outer space.

It is known that full and instantaneous fields of view are the main characteristics of the collimating optical system of HUD. Full field of view specifies maximum size of information field which the operator can view against the outer space background taking into account additional movements of his head within an eyes box. The instantaneous field of view is a part of full field of view seen by the operator while his head is located in fixed position in a center of the eyes box. The higher these angular parameters value the more informational capabilities HUD has that is of the utmost importance for performance of some tasks. At the same time discomfort caused by need to move the head horizontally and vertically, especially under accelerative forces, in order to read visual information located in peripheral areas of full field of view is eliminated due to increasing of size of the instantaneous field of view.

Currently two methods are used to build the collimating optical system for HUD:
 ax symmetric scheme using lens optics; and
 plane-symmetric scheme using decentered no planar reflecting elements mainly being holographic optical elements—HOE.

The design feature of the ax symmetric collimating optical system is: to enlarge full angular field of view, it is necessary to reduce a focal length and to enlarge instantaneous angular field of view, it is necessary to increase a light diameter of an output lens. So it is necessary to increase a relative aperture by increasing a diameter of output lens of optical system in order to increase full and instantaneous angular fields of view simultaneously. But always there are design constraints excluding uncontrolled increasing of the diameter of output lens. Substantially this is to ensure safety for the operator since the distance from the operator to display is reduced. Therefore generally collimating optical systems are used having the diameter of the output lens of 120-140 mm, full angular field of view (circular) not exceeding 25° and instantaneous field of view 16° in horizontal direction and 12° in vertical direction and using single flat semitransparent reflector—single-component combiner, installed above the output lens and shifted by 40°-50° relative to the horizontal plane. Significant moving of head the operator in horizontal and vertical directions is required while reading information, formed by HUD within full angular field of view. Devices by U.S. Pat. No. 6,392,812, U.S. Pat. No. 7,391,574, U.S. Pat. No. 8,879,156 are examples of HUD of this type.

The HUDs are known with ax symmetric collimating optical system using two parallel plane semitransparent reflectors installed above the output lens—two-component combiner—providing increasing of the instantaneous field of view up to 17°×17° (patent US 2012/0127381 A1). Considered configurations of HUDs of most usual type based on ax symmetric collimating optical system have sufficiently restricted technical capabilities for simultaneous increasing of full and instantaneous angular fields of view.

Application of plane-symmetric scheme using decentered no planar reflecting elements mainly being holographic optical elements—HOE allows to expand full and especially instantaneous angular fields of view of collimating optical system and make closest approach to their equality. Theoretical examples of building of such collimating optical systems of HUD based on HOE may be devices by U.S. Pat. No. 4,407,564 and U.S. Pat. No. 5,640,275. Practical application of HOE in these devices allows to increase size of full angular field of view up to 30° and instantaneous angular field of view up to 27° in horizontal direction and up to 24° and 22° in vertical direction accordingly. In such collimating optical systems single or several HOE installed on the system output are the most complicated and bulky optical elements. At the same time the main HOE is installed in front of the operator and works as semitransparent combiner providing forming of collimated image of information field against the outer space background. The size of such HOE is up to 300-350 mm and usually in itself is a non-planar decentered glass substrate coated with complex multi-layered (or volume) hologram providing high transparency within visible spectral range (up to 80%) and effective reflection (up to 70-80%) for the light rays of specified (operating) wavelength (usually green) coinciding with a maximum radiation of imager (CRT or LCD) generating primary image. To make such HOE sophisticated technology providing high vibration strength and seismic stability is required that is accessible only for highly developed industrial production and costly. For this reason only limited number of up-to-date aircrafts possessing high tactical and technical capabilities is equipped with HUD provided with collimating optical systems based on HOE.

A method of widening of angular field of view of HUD in horizontal plane is disclosed in a U.S. Pat. No. 8,982,472. The suggested method does not provide capability to increase angular field of view in vertical plane additionally. Meanwhile the increasing of the field of view in vertical direction is of the utmost importance for performance of tactical tasks in an upper hemisphere. In present Application for patent a complex solution of the problem of increasing of full and instantaneous fields of view in the directions of both coordinates by using ax symmetric schemes with application of lens optical elements and flat reflectors is disclosed. The ideas disclosed in the U.S. Pat. No. 8,982,472 have been developed further in the present Application. To solve the problem of increasing of angular field of view of HUD an integral approach to the problem solving has been used that made it possible to gain presumable result.

SUMMARY OF THE INVENTION

A HUD is proposed in which increasing of full and instantaneous angular fields of view in horizontal and vertical directions is gained by using of two or several unified sources of collimated images—further indicated USCI—located in horizontal direction, made with two optoelectronic channels: main and secondary, each of them consists of a display module forming a part of total original image, and ax symmetric collimating optical lens system, provided with common optical combiner through which the operator can see combined collimated image of original information picture against the outer space background.

To increase size of full and instantaneous fields of view in vertical direction the optical combiner is made with three flat semitransparent reflectors, first and second reflectors are installed parallel to each other above the output lenses of the main channels of USCI at an angle 40° . . . 50° to the horizontal plane, spaced at a certain distance related to each other in vertical direction, and third reflector is installed above the first and second reflectors. At the same time:

first reflector located closer to the output lenses of the main channels is made 2.5-3.0 times longer than the second reflector;

optical axes of the output lenses of secondary optoelectronic channels are located between the first and second reflectors;

third reflector is installed at an angle of inclination relative to the first reflector which makes it possible for the operating light beams of the secondary channels to pass through the eyes box of operator after reflecting from the third reflector.

Combined angular field of view of HUD is equal to the sum of full angular fields of view of the main and secondary channels of all USCI and:

all main and secondary optoelectronic channels have full angular fields of view of squared shape, their boundaries are oriented in the horizontal and vertical directions correspondingly, sizes of full angular fields of view of all channels in horizontal directions are identical in each USCI lower horizontal boundary of full angular field of view of the secondary optoelectronic channel is superposed with upper horizontal boundary of full angular field of view of the main optoelectronic channel;

adjacent vertical boundaries of main and secondary optoelectronic channels of neighboring USCI are superposed.

To provide uniform brightness of collimated image within full angular field of view of HUD, the first reflector of the optical combiner has beam-splitting coating only on its lower part, the second and third reflectors have beam-splitting coating on the whole surface and:

upper boundary of the beam-splitting coating of the first reflector is arranged in a plane passing through a lower edge of the second reflector and a center of the eyes box of the operator;

lower edge of the third reflector is arranged in a plane passing through an upper edge of the second reflector and the center of the eyes box of the operator;

upper edge of the first reflector is arranged in a plane passing through an upper edge of the third reflector and the center of the eyes box of the operator; and reflection coefficients of the first, the second and the third reflectors are not exceeding 0.23, 0.30 and 0.23 correspondingly.

In view of implementation of novel alternative approach to the design foregoing main features of the proposed HUD allow to achieve sizes of full and instantaneous fields of view at vertical and horizontal directions that are comparable and even exceeded the similar parameters of HUD based on HOE and also all existing HUDs using ax symmetric collimating optical systems. At the same time outer dimensions of the proposed HUD are practically equal to the outer dimensions of the HUD based on the HOE.

DETAILED DESCRIPTION OF PREFERRED EMBODIMENT OF THE INVENTION

The integral approach has been applied to increasing of full and instantaneous angular fields of view both in horizontal and in vertical directions in the proposed HUD and specifically:

increasing of fields of view in horizontal direction is achieved by using of two or several unified sources of collimated images—USCI spaced out in horizontal direction and conjugated with the single optical combiner; and increasing of angular fields of view in vertical direction is achieved because that each USCI contains two optoelectronic channels—main and secondary and the combiner consists of three components.

Figure 1A:
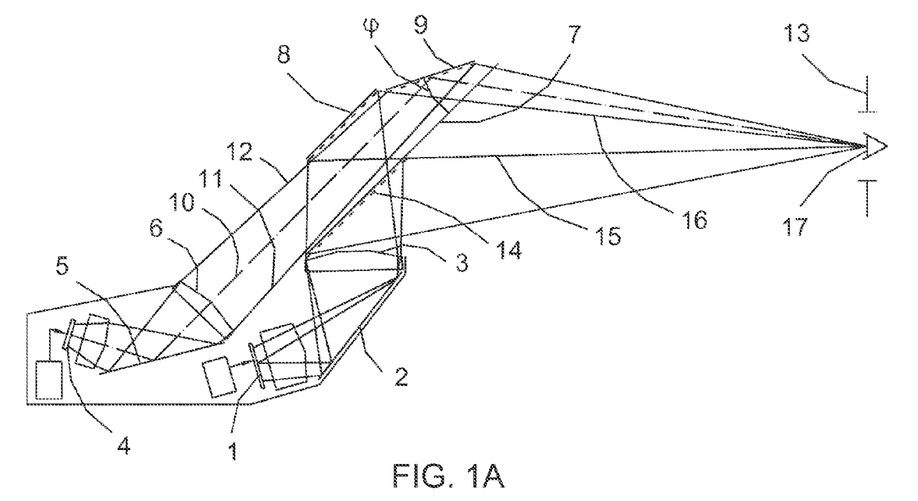
FIG. 1A. Structure chart of single USCI with two optoelectronic channels and three-component combiner.

By FIG. 1A: The structure chart of the single USCI with the three-component combiner. USCI contains two optoelectronic channels:

the main channel consisting of the display module 1 and the ax symmetric collimating lens optical system 2 with the output lens 3; and the secondary channel consisting of the display module 4 and the ax symmetric collimating lens optical system 5 with the output lens 6.

The combiner with three flat semitransparent reflectors—components—is installed above the optoelectronic channels, the first reflector 7 and the second reflector 8 are installed parallel to each other above the output lens 3 of the main channel at an angle 40° . . . 50° to the horizontal plane and spaced out relative to each other in vertical direction; the third reflector 9 is installed above the first and the second reflectors. At the same time:

the length of the first reflector 7 located closer to the output lens 3 of the main channel is 2.5 . . . 3.0 times more than the length of the second reflector 8;

an optical axis 10 of the output lens 6 of the secondary optoelectronic channel is located between the first and the second reflectors;

the third reflector 9 is installed at an angle of inclination $\phi$ relative to the first reflector 7 under which the operating light beams bounded by the rays 11 and 12 emerging from the secondary channel pass through the eyes box 13 after reflecting from the third reflector 9;

the first reflector 7 has beam-splitting coating only on the lower part 14 (dot line), the upper boundary of which is located in the plane 15 passing through the lower edge of the second reflector 8 and the center of eyes box 13, the second and the third reflectors have beam-splitting coating on the whole surface; and the upper edge of the second reflector 8 and the lower edge of the third reflector 9 are located in the plane 16 passing through the center of the eyes box 13.

Figure 1B:
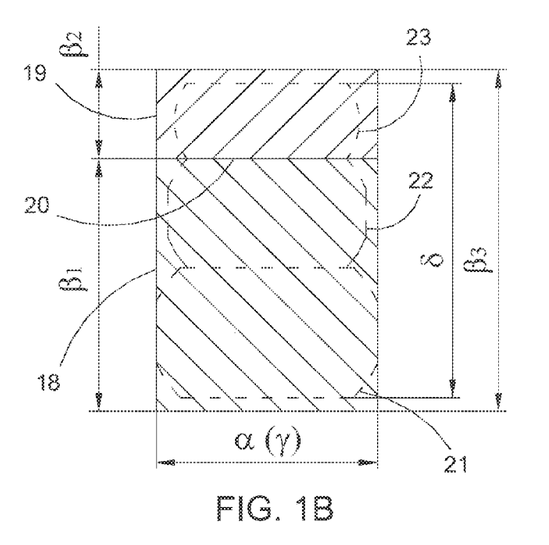
FIG. 1B. Diagrams of full and instantaneous angular fields of view of USCI with two optoelectronic channels and three-component combiner.

By FIG. 1B: The operator whose eyes 17 are located within the eyes box 13 is able to view uninterruptedly the collimated images forming both by the main and by the secondary optoelectronic channels against the outer space objects.

the main and the secondary optoelectronic channels have full angular fields of view of square shape and their boundaries are oriented in horizontal and vertical directions respectively;

the sizes of full angular fields of view of both channels in horizontal direction are equal (indicated α); ular fields of view of both channels in horizontal direction are equal (indicated α); and the lower horizontal boundary 20 of full angular field of view of the secondary optoelectronic channel is superposed with the upper horizontal boundary of full angular field of view of the main optoelectronic channel.

As appears from FIG. 1B the size of combined angular field of view of the USCI with three-component combiner is α×β, vertical size $β_3$ is equal to a sum of vertical sizes $β_1$ and $β_2$ of full angular fields of view of the main and the secondary channels respectively. Three outlines of instantaneous fields of view seen by the operator 17 from the center of eyes box 13 are shown against the background of full angular fields of view:

instantaneous field of view 21 seen by use of the main channel and beam-splitting coating 14 of the first reflector 7;

instantaneous field of view 22 seen by use of the main channel and the second reflector 8; and instantaneous field of view 23 seen by use of the secondary channel and the third reflector 9.

Maximum sizes of the combined instantaneous field of view of the USCI with three-component combiner are indicated γ (in horizontal direction)×δ (in vertical direction).

Calculations show that while using ax symmetric collimating optical systems of medium complexity in the main and the secondary channels you can get the following angular parameters of USCI with three-component combiner:

α=16°; $β_1$=18.5°; $β_2$=6.5°; $β_3$=25°
γ=16°; δ=23°,

You can get the square shaped full angular field of view of the main optoelectronic channel with sizes α×$β_1$=16°×18.5° while using ax symmetric collimating optical system with conventional circular field of view, the angular size $ω_M$ of diameter of which has to be not less than diagonal of required square shaped field, i.e. the following condition has to be performed:

$$ω_M ≥ (α^2+β_1^2)^{0.5}=(16^2+18.5^2)^{0.5}≈24.5°.$$

The output lens of the main channel is circular, the diameter is 140 mm, i.e. not exceeding the diameter of the output lens of known HUDs; full angular field of view is 25° and the upper and lower segments of the lens is truncated up to vertical size 120 mm.

Arguing similarly you can get the required size $ω_A$ of the circular field of view of ax symmetric collimating optical system for the secondary channel:

$$ω_A ≥ (α^2+β_2^2)^{0.5}=[(16^2+6.5^2)^{0.5}≈17.5°.$$

Due to significantly decreased size of angular field of view the output lens of the secondary channel may be made with the diameter increased up to 160 mm and with upper and lower segments truncated up to vertical size 90 ... 120 mm. Availability of the lens with truncated segments allows to provide optimal layout of the main and secondary channels with required square shaped full and instantaneous angular fields of view.

Figure 2A:
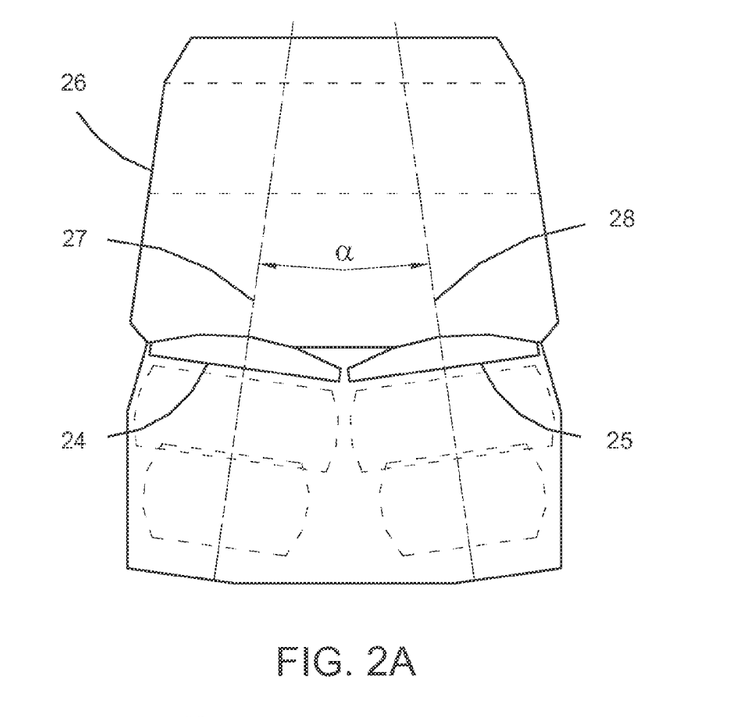
FIG. 2A. Structure chart of HUD with two USCI and three-component combiner.

FIG. 2A shows the structure shirt of HUD with two USCI and three-component combiner-view from the eyes box. The proposed HUD contains two USCI (left 24 and right 25) spaced out in horizontal direction and common three-component combiner 26. The structure of the USCI and the combiner have been described in detail above, by use of FIG. 1. Each USCI is installed relative to the three-component combiner so that the symmetry planes 27 and 28 of the left and right USCI respectively are at an angle 0.5α to the symmetry plane 29 of the three-component combiner and an angle α between the symmetry planes 27 and 28 is equal to the horizontal size of full angular field of view of single USCI.

Figure 2B:
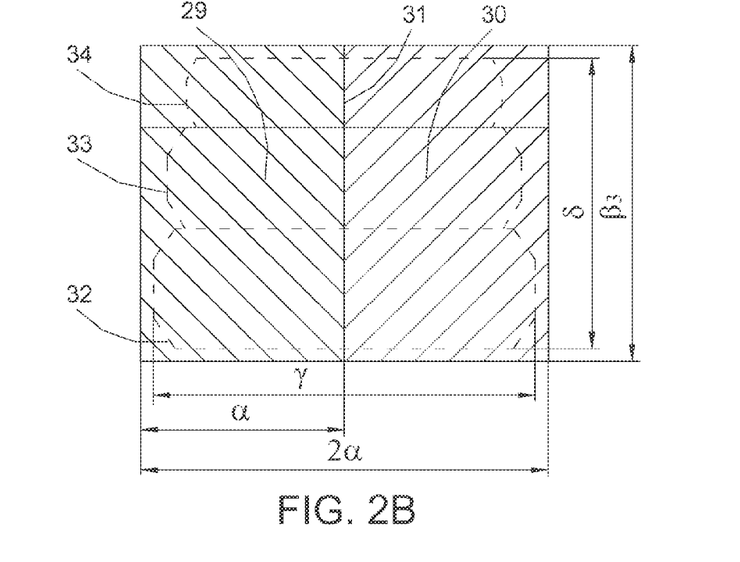
FIG. 2B. Diagrams of full and instantaneous angular fields of view of HUD with two USCI and three-component combiner.

The diagram of full and instantaneous fields of view of the HUD with two USCI and three-component combiner is shown at FIG. 2B. Full angular field of view of HUD consists of full angular field of view 29 of the left USCI 24 and full angular field of view 30 of the right USCI 25 and adjacent vertical boundaries of these fields of view are superposed along the line 31. By FIG. 2B, the size of combined angular field of view of the HUD with two USCI and three-component combiner is 2α×$β_3$.

Three outlines of instantaneous fields of view are shown against the background of full angular fields of view and:

instantaneous field of view 32 is seen by use of the main channels of both USCI and the first reflector of the combiner; and instantaneous field of view 33 is seen by use of the main channels of both USCI and the second reflector of the combiner.

Instantaneous field of view 34 is seen by use of the secondary channels of both USCI and the third reflector of the combiner.

Maximum size of the combined instantaneous field of view of the HUD with two USCI and three-component combiner are indicated $γ_2$ (in horizontal direction)×$δ_2$ (in vertical direction).

Calculations show: while using USCI and three-component combiner by FIG. 1A described above, it is possible to get the following angular parameters of the HUD with two USCI and three-component combiner:

combined full field of view (2α×β3)=32°×25°; and
combined instantaneous field of view (γ2×δ2)=30°×23°.

Figure 3A:
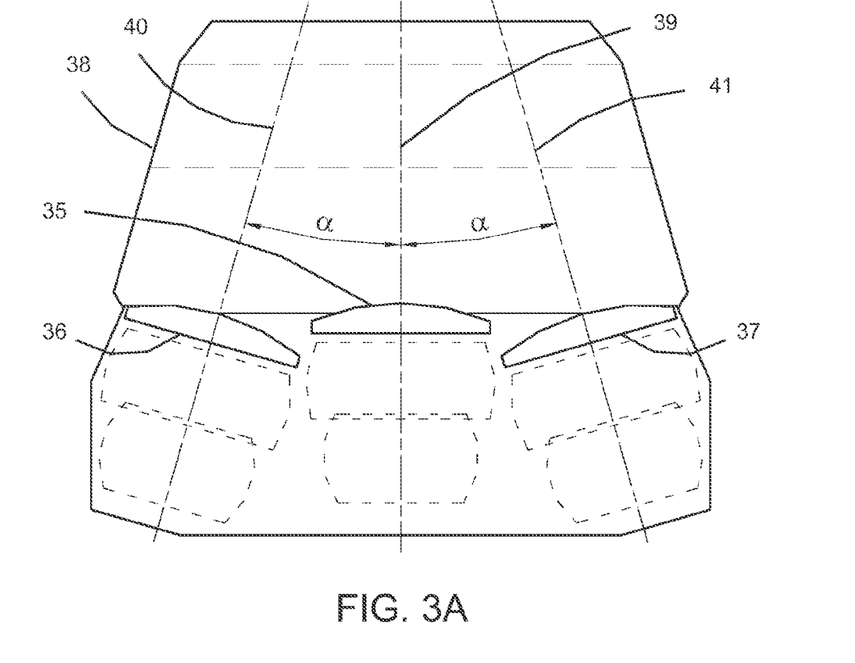
FIG. 3A. Structure chart of HUD with three USCI and three-component combiner.

The structure chart of HUD with three USCI and three-component combiner (view from the eyes box) is shown at FIG. 3A. The proposed HUD contains three USCI (middle 35, left 36, right 37) spaced out in horizontal direction and common three-component combiner 38, the symmetry plane 39 of the middle USCI is superposed with the symmetry plane of three-component combiner and the symmetry planes 40 and 41 of the left and right USCI respectively are at an angle α to the symmetry plane 39 of the three-component combiner and the angle α is equal to the horizontal size of full angular field of view of single USCI.

Figure 3B:
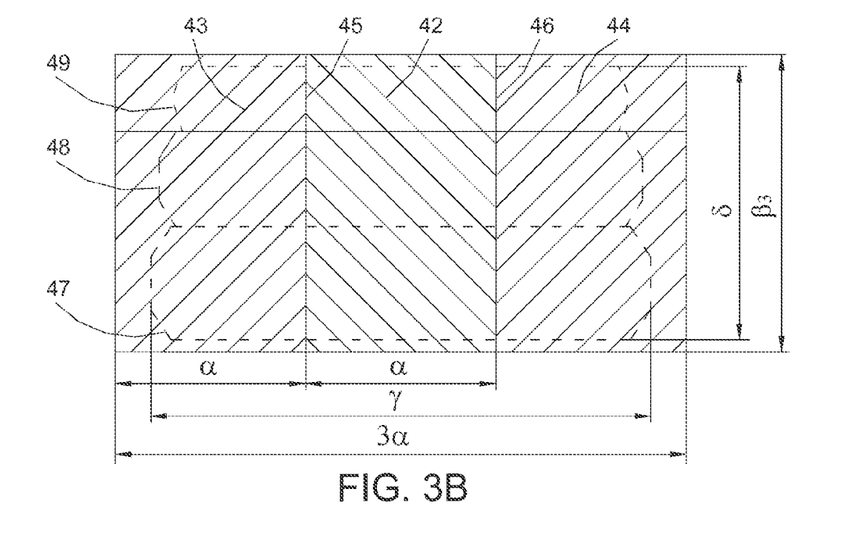
FIG. 3B. Diagrams of full and instantaneous angular fields of view of HUD with three USCI and three-component combiner FIG. 4. The features of operation of HUD with three-component combiner.

The diagram of full and instantaneous fields of view of the HUD with three USCI and three-component combiner is shown at FIG. 3B. Full angular field of view of the HUD consists of full angular fields of view 42, 43 and 44 of the middle, the left and the right USCI respectively and the adjacent vertical boundaries of neighboring fields are superposed with each other along the lines 45 and 46. By FIG. 3B: the size of combined angular field of view of HUD with three USCI and three-component combiner is 3α×$β_3$.

Three outlines of instantaneous fields of view are shown against the background of full angular fields of view and:

instantaneous field of view 47 is seen by use of the main channels of all three USCI and the first reflector of the combiner;

instantaneous field of view 48 is seen by use of the main channels of all three USCI and the second reflector of the combiner; and instantaneous field of view 49 is seen by use of the secondary channels of all three USCI and the third reflector of the combiner.

Maximum size of combined instantaneous field of view of the HUD with three USCI and three-component combiner is indicated $\gamma_3$ (in horizontal direction)×$\delta_3$ (in vertical direction).

Calculations show: while using USCI and three-component combiner by FIG. 1A described above it is possible to get the following parameters of the HUD with three USCI and three-component combiner:

combined full angular field of view (2α×β$_3$)=48°×25°;
combined instantaneous field of view (γ$_3$×δ$_3$)=42°×23°.

Figure 4:
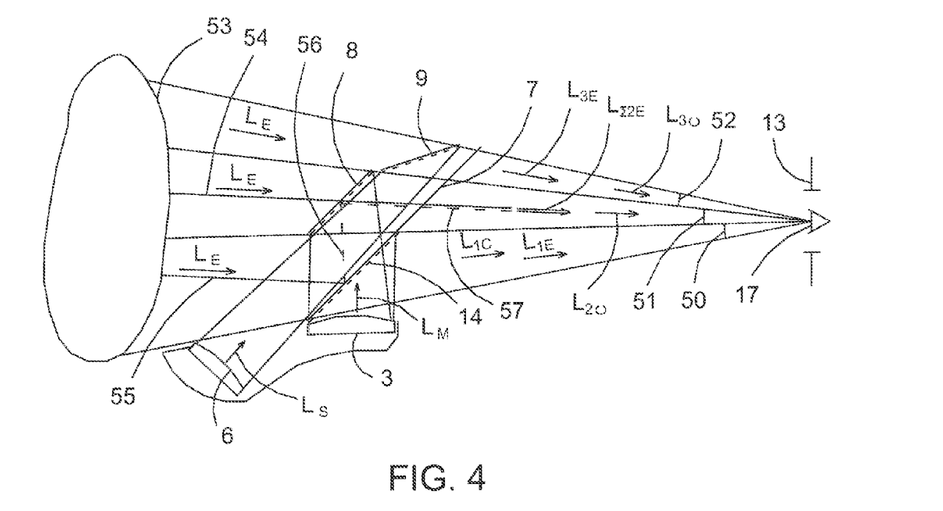

One of the features of HUD with three-component combiner is that collimated image is formed in three spatial areas as shown at FIG. 4:

in the area 50 overlapped by beam-splitting coating 14 of the first reflector 7;

in the area 51 overlapped by the second reflector 8; and in the area 52 overlapped by the third reflector 9.

In the first two areas 50 and 51 the collimated image is formed by the main channel with the output lens 3, in the third area 52—by the secondary channel with the output lens 6. Brightness of the collimated image $L_{1C}$ and $L_{2C}$ in the first two areas 50 and 51 is calculated by formulas:

$$L_{1C}=\rho_1 L_M \quad (1)$$

$$L_{2C}=\rho_2(1-\rho_1)L_M \quad (2)$$

where: $L_M$—brightness of the collimated image after exiting the output lens 3 of the main channel; and $\rho_1$ and $\rho_2$—reflection coefficients of beam-splitting coatings of the first and second reflectors 7 and 8 of the combiner, respectively.

Brightness of collimated image $L_{3C}$ in the third area 52 is calculated by formula:

$$L_{3C}=\rho_3 L_A \quad (3)$$

where: $L_A$—brightness of the collimated image after exiting the output lens 6 of the secondary channel;

$\rho_3$—reflection coefficient of beam-splitting coating of the third 9 reflector.

Usually the collimated image in all three areas (50, 51 and 52) is viewed against the external background 53 with uniform brightness $L_E$. The operator 17 is able to perceive external background in the area 50 and area 52 with brightness $L_{1E}$ and $L_{3E}$. calculated by formulas:

$$L_{1E}=(1-\rho_1)L_E \quad (4)$$

$$L_{3E}=(1-\beta_3)L_E \quad (5)$$

where: $\rho_1$ and $\rho_3$—reflection coefficients of beam-splitting coatings of the first 7 and the third 9 reflectors of the combiner respectively.

It is important to consider forming of the image of external background in the area 52 in which the light rays enter the eyes of the operator 17 by two paths:

along the line 54 due to partial transmission of light rays by beam-splitting coating of the second reflector 8; and along the lines 55. 56 and 57 due to successive reflections from beam-splitting coating 14 of the first reflector 7 and beam-splitting coating of the second reflector 8 of the combiner.

By FIG. 4: the lines 55, 56 and 57 are parallel to each other since the first 7 and the second 8 reflectors of the combiner are parallel to each other. The operator 17 is able to perceive brightness $L_{\Sigma 2E}$ of external background in the area 51 as a sum of brightness $L_{2E}$ of external background along the line 54 and brightness $L_{12E}$ of external background along the lines 55, 56 and 57 and specifically:

$$L_{2E}(1-\rho_2)L_E$$

$$L_{12E}=\rho_1\rho_2 L_E$$

$$L_{\Sigma 2E}=L_{2E}+L_{12E}$$

$$L_{\Sigma 2E}(1-\rho_2+\rho_1\rho_2)L_E \quad (6)$$

To provide the uniform brightness in all three areas the following condition has to be fulfilled:

$$L_{1E}=L_{\Sigma 2E}=L_{3E} \quad (7)$$

n view of formulas (4), (5) and (6) the result is the system of two equations with three unknown parameters ($\rho_1$, $\rho_2$, $\rho_3$):
(1-$\rho_1$)=(1-$\rho_2$+$\rho_1\rho_2$)

$$\rho_3=\rho_1 \quad (8)$$

Figure 5:
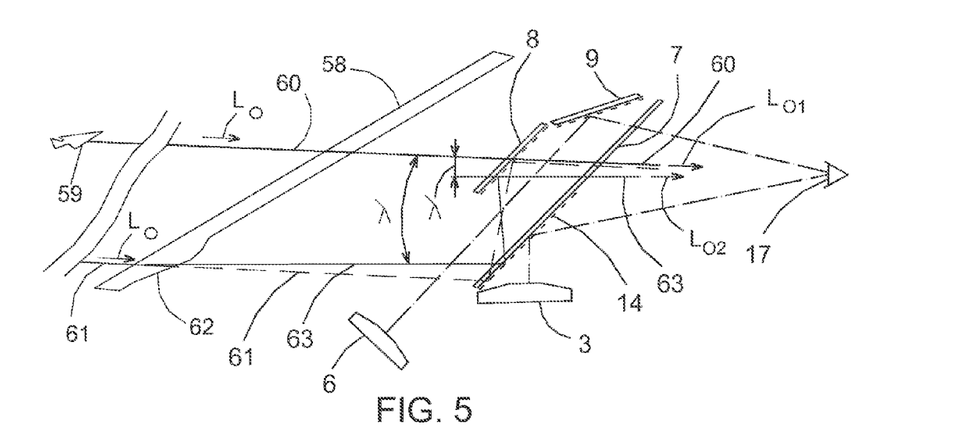
FIG. 5 Interaction between three-component combiner and windshield.

It is necessary to consider a feature of the three-component combiner while operating jointly with the windshield of the aircraft equipped with the HUD with three-component combiner. By FIG. 5: the combiner consisting of three reflectors 7, 8,9, windshield 58 and distant outer object 59 of smallish angular size. The operator 17 sees the object 59 along the ray 60 passing through the upper area of the windshield 58, second reflector 8 and transparent area of the first reflector 7 and also the operator is able to see it along the ray 61 (practically parallel to the ray 60 due to large distance to the outer object 59) passing through the lower area of the windshield and sequentially reflected from beam-splitting coating of the first 7 and second 8 reflectors of the combiner. If the windshield 58 is a parallel-sided plate then the ray 61 remains parallel to the ray 60 after passing through it (dot line) and after successive reflecting from the parallel components 7 and 8 coincides with the ray 60. But more often the windshield 58 (windscreen, viewing port, etc) has optical defects and, for example, wedging 62 within the area of passage of the ray 61 which causes the deviation of this ray from primary direction-ray 63. Then after passing the windshield a certain angle λ appears between the rays 60 and 63 which remains after successive reflections of the ray 63 from parallel reflectors 7 and 8. In this case while viewing through the second reflector 8 the operator 17 may see ghosting of the outer object 59 if the angle λ is comparable or exceeding the angular size of the outer object, the brightness of the ghost image along the ray 63 is high enough. We denote the brightness of the outer object before passing through the windshield along the rays 60 and 61-$L_O$, after passing the combiner along the ray 60-$L_{O1}$ and along the ray 63-$L_{O2}$. Then the brightness-$L_{O1}$ of the main image and the brightness-$L_{O2}$ of the ghost image are defined by following formulas:

$$L_{O1}=(1-\rho_2)L_O \quad (9)$$

$$L_{O2}=\rho_1\rho_2 L_O \quad (10)$$

Here $\rho_1$ and $\rho_2$—reflection coefficients of beam-splitting coatings of the first 7 and second 8 reflectors of the combiner respectively.

The ratio M between the brightness-$L_{O1}$ and brightness-$L_{O2}$ of the outer object is defined by the formula:

$$M = L_{O2}/L_{O1} = \rho_1 \rho_2/(1-\rho_2) \quad (11).$$

By inserting the mathematical expression (11) into the formula we get:

$$M = L_{O2}/L_{O1} = (\rho_1)^2/(1-2\rho_1) \quad (12).$$

In practice the ghost image of the outer object does not affect the operation of the HUD if the brightness $L_{O2}$ of the ghost image is not exceeding threshold value 8 . . . 10% of the brightness $L_{O1}$ of the main image of the outer object and specifically:

$$M = (\rho_1)^2/(1-2\rho_1) \leq 0.1.$$

In view of (2), we get the requirements to the values of $\rho_1$ and $\rho_2$ under which ghosting of outer objects is almost not be noticeable:

$$\rho_1 \leq 0.23$$

$$\rho_2 \leq 0.30.$$

While viewing through the first and third reflectors of the combiner the ghosting of the outer objects does not occur since in this case there are no extraneous reflections from the components of the combiner of the rays from the outer objects. Therefore in view of (8) the reflection coefficient $\rho_3$ of beam-splitting coating of the third component of the combiner has to be equal to the reflection coefficient $\rho_1$ of beam-splitting coating of the first component:

$$\rho_3 \leq 0.23.$$

One of the features of the proposed wide-angle HUD with several USCI and three-component combiner is application of up-to-date displays with flat screens of square shape as sources of primary image that are the most compact sources of luminous image of high energy efficiency currently and significantly more effective than projection CRT traditionally used in HUD in the past due to high resolution, lighting performance and advanced Digital electronics providing image control.

Due to wide range of sizes it is possible to use the displays with the screens of required sizes and resolution in the HUD. It is known that the resolution of collimated image defined by an angular size of a single pixel of the display has to comply with angular resolution of human eye (1 angular minute) and therefore the resolution of the display installed in any optoelectronic channel has to be proportional to the full angular field of view of this channel, i.e., the number of pixels in horizontal and vertical directions has to be not less than corresponding sizes of angular field of view of the channel given in angular measure.

So in the main channels with angular field of view 16°×18.5° the display is required with resolution in horizontal direction not less than 16·60=960 pixels and in vertical direction not less than 16.5·60=1120 pixels, for example the display of standard format 1024×1280 pixels. Linear dimensions of the single pixel are defined by formula:

$$p_M = 0.0003 f_M$$

where: $f_M$—focal length of optical system of the main channel.

Taking a value $f_M$ equal to the diameter of the output lens of the main channel ($f_M \approx 140_{MM}$), we get $p_M \approx 0.0003 \cdot 140 = 0.042$ mm. Then the linear dimensions of the display screen of the main channel result in:

(1024·0.042)×(1280·0.042)≈43×54 mm or 2.7 inches on the bias.

For the secondary channels with the angular fields of view 16°×6.5° the display with resolution in horizontal direction not less than 16×60=960 pixels and in vertical direction—not less than 6.5×60=390 pixels, for example, the display of standard format 960×540 pixels is applicable. Taking the focal length $f_A$ of the collimating optical system of the secondary channel equal to the diameter of the output lens of the secondary channel ($f_A \approx 160$ mm) we get a result: $p_A \approx 0.0003 \times 160 = 0.048$ mm. Then the linear dimensions of screen of the display of the secondary channel result in:

(960·0.048)×(540·0.048)≈46×26 mm or about 2.8 inches on the bias.

The proposed wide-angle HUD has integrated angular field of view consisting of two (see FIG. 1B), four (see FIG. 2B) or six (see FIG. 3B) square shaped segments conjugated between each other that form the collimating image which has to be perceived by the operator as overall information picture. For this purpose all displays included in the optoelectronic channels of HUD have to operate with common synchronization and identical refresh rate of frames forming the corresponding parts (segments) of the primary information picture. Loss of lock of timing or frequency synchronization of single parts of the combined image causes the worsening of conditions for perception and undue fatigability of the operator while working with HUD and that is inadmissible.

Advantages of the Invention

Development of new technical and technological solutions allowing to increase full and instantaneous angular fields of view of HUD are still vital topic. Real sample of HUD with largest full and instantaneous angular fields of view (30° in horizontal direction and 24° in vertical direction) is a HUD based on application of big-volume reflecting HOE. Limited number of aircrafts is equipped with such HUD because of manufacturing complexity and high cost of big-volume HOEs required to achieve the specified angular parameters. It is necessary to find solution to the problem of developing of HUD with the same large full and instantaneous angular fields of view but on the basis of simple and accessible spherical optical elements.

Suggested new construction of HUD allows to achieve and exceed specified above angular parameters of full and instantaneous angular fields of view of HUD without using of HOE. The main features of the new construction of HUD are:

- application of two or more two-channel unified sources of collimated image (USCI) and a single three-component combiner. Only ax symmetric lens elements and flat reflectors are used in optical systems of USCI;
- availability of two display elements in each of the USCI operating synchronously both between each other and with the display elements of the adjacent USCI. At the same time all display elements of HUD are controlled by single Board computer provided with the software that makes it possible for each display element to form a corresponding image constituting a part of the whole combined image represented within the full angular field of view of HUD.

Really achieved parameters of known HUDs (it. 1, 2, 3 table 1) and calculated parameters of the proposed HUDs (it. 4, 5 table 1) are stated below.

| No | Type of combiner and optical system of HUD | Full angular field of view | Instantaneous angular field of view |
|---|---|---|---|
| 1 | One-component combiner ax symmetric optical system | Ø 25° | 16° × 12° |
| 2 | Two-component combiner ax symmetric optical system | Ø 25° | 17° × 17° |
| 3 | Combiner on the basis of HOE Decentered optical system | 30° × 24° | 27° × 22° |
| 4 | Three-component combiner Two ax symmetric USCI | 32° × 25° | 30° × 23° |
| 5 | Three-component combiner Three ax symmetric USCI | 48° × 25° | 42° × 23° |

Owing to squared shape of field of view the proposed HUD has an important advantage: its information area is 1.3 times larger than the information area of HUD based on HOE. Owing to such advantage it is possible to increase a content or spread out information picture for improving of readability of graphic information under some operation modes of HUD. Tactical capabilities of proposed HUD are also improved. Above stated data confirm efficiency of the suggested novel engineering solutions of construction of wide-angle HUD.

Due to availability of no less than four display elements resolution of the proposed HUD is significantly higher than of all known HUDs including HUDs on the basis of HOE. Calculations show that the total resolution of several USCI provide forming of combined image within full angular field of view of the proposed HUD with resolution exceeding the resolution of human eye.

Therefore the output collimated image formed within the angular field of view of HUD is perceived by the operator without discontinuity and saw-shaped representing of linear elements of graphics in spite of a pixel structure of a display generators of primary image.

Owing to high lighting capabilities of display generators of primary image more high brightness of the output collimated image than in known HUDs including HUD on the basis of HOE is provided. High light transmittance of the reflectors of the combiner allows to perceive the outer space almost similar as if using HUD based on HOE.

High lighting parameters of display generators and pixel structure of the primary image allow to provide increasing of visual contrast of the output image of most important parameters due to increasing of number of the pixels providing their representing under extreme conditions (flight over snow-covered terrain, water surface, operating against the background of white clouds illuminated by the sun, etc.)

Developed on the new basis the proposed HUD constructively fits in a dashboard of the aircrafts and other piloted objects in which HUD is to be installed since its outer dimensions including front are not exceeded corresponding outer dimensions of HUD on the basis of HOE.

Owing to scientific progress and process improvement in the field of optics and electronics in prospect it is expected that using of acrylic plastic having stable optical parameters in the operation conditions of the aircraft in order to make optical lenses by casting or by use of 3D printer and also application of electronic components with more high integrity and improved parameters make the manufacturing of the proposed HUD less expensive and the weight of HUD is decreased.

What is claimed is:

1. A wide-angle HUD for forming collimated image of information picture to enlarge full and instantaneous angular fields of view in horizontal and vertical directions comprising:

two or several unified sources of collimated images USCIs spaced in horizontal direction, each USCI having main and secondary optoelectronic channels, each channel having a display element forming specified part of primary information picture, a collimating system, and an output lens; and an optical combiner for viewing combined collimated image of primary information picture formed by all USCIs against outer space background.

2. The wide-angle HUD of claim 1 wherein said optical combiner has three flat semitransparent reflectors: first and second reflectors installed mutually parallel above said output lenses of the main channels at an angle between 40° and 50° relative to horizontal plane and spaced out relative to each other in vertical direction at a certain distance, and a third reflector installed above the first and second reflectors.

3. The wide-angle HUD of claim 2 wherein optical axes of the output lenses of the secondary optoelectronic channels are located between the first and second reflectors of the optical combiner.

4. The wide-angle HUD of claim 2 wherein the first reflector installed closer to the output lenses of the secondary channels is 2.5 . . . 3.0 times longer than the second reflector.

5. The wide-angle HUD of claim 2 wherein the third reflector of the optical combiner is installed at an angle of inclination relative to the first reflector under which operating light beams of the secondary channels pass through an eyes box of an operator after reflecting from the third reflector.

6. The wide-angle HUD of claim 2 wherein the first reflector of the optical combiner has a beam-splitting coating only on a lower part, an upper boundary of the beam-splitting coating being arranged in a plane passing through a lower edge of the second reflector and a center of an eyes box of an operator; and wherein the second and the third reflectors have beam-splitting coatings on whole surfaces thereof.

7. The wide-angle HUD of claim 2 wherein an upper edge of the second reflector and a lower edge of the third reflector are arranged in a plane passing through a center of an eyes box of an operator.

8. The wide-angle HUD of claim 2 wherein the first, second and third reflectors of the optical combiner have beam-splitting coatings thereon, reflection coefficients of which not exceeding 0.23, 0.30 and 0.23, correspondingly.

9. The wide-angle HUD of claim 1 wherein the main and the secondary optoelectronic channels have full angular fields of view of squared shape with boundaries oriented in horizontal and vertical directions, correspondingly, and wherein sizes of full angular fields of view of all channels in horizontal direction are equal.

10. The wide-angle HUD of claim 9 wherein a combined angular field of view is equal to a sum of the full angular fields of view of the main and secondary channels of all users.

11. The wide-angle HUD of claim 10 wherein, in each USCI, a lower horizontal boundary of the full angular field of view of the secondary optoelectronic channel is superposed with an upper horizontal boundary of the full angular field of view of the main optoelectronic channel.

12. The wide-angle HUD of claim 10 wherein, in each USCI adjacent upper vertical boundaries of the main and the secondary optoelectronic channels of neighboring USCI are superposed.

13. The wide-angle HUD of claim 1 wherein a resolution of each display element is proportional to a size of a full angular field of view of the optoelectronic channel containing this display element.

14. The wide-angle HUD of claim 1 wherein all display elements have common synchronization and identical refresh rate of corresponding parts of primary information picture.

\* \* \* \* \*